United States Patent Office 2,785,170
Patented Mar. 12, 1957

2,785,170

2-[BENZYL(2-DIMETHYLAMINOETHYL)AMINO]-PYRIDINE N-OXIDES

Fred Kagan, Kalamazoo Township, Kalamazoo County, Mich., assignor to The Upjohn Company, Kalamazoo, Mich., a corporation of Michigan No Drawing. Application August 16, 1955,
Serial No. 528,809

5 Claims. (Cl. 260—296)

This invention relates to new organic organic compounds and is particularly directed to 2-[benzyl(2-dimethylaminoethyl)amino]-pyridine N-oxide either as the free base or as an acid addition salt thereof.

It is an object of the invention to provide novel physiologically active compounds. It is a further object to provide novel antihistaminics. It is a further object to provide novel compounds which are safe and effective for this purpose and have a higher therapeutic index than the corresponding tertiary amine.

These and other objects are accomplished in the novel compounds of the invention which are represented by the following basic formula:

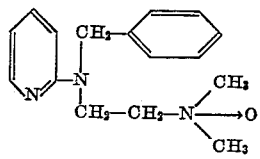

and can exist and can be used for the purposes of the invention in the form of the free base or an acid addition salt thereof with a pharmacologically acceptable acid such as hydrochloric, hydrobromic, hydriodic, sulfuric, phosphoric, nitric, acetic, benzoic, salicylic, glycolic, succinic, nicotinic, tartaric, maleic, malic, lactic acids, and the like.

The invention may be more fully understood by the following examples which are illustrative only and not to be construed as limiting.

*Example 1.—2-[benzyl(2-dimethylaminoethyl)amino]-pyridine N-oxide free base*

2-[benzyl(2-dimethylaminoethyl)amino]-pyridine hydrochloride (29.2 grams) dissolved in water containing 5.0 grams of sodium hydroxide was extracted with methylene chloride. The methylene chloride solution of the free base was concentrated on a steam bath. The residual oil was dissolved in ethyl alcohol and thirty milliliters of thirty percent hydrogen peroxide was added. The clear solution was stored at room temperature for 5½ days and excess hydrogen peroxide was destroyed by careful addition of platinum oxide. The solution turned yellow and became quite warm during this treatment. The catalyst was removed by filtration and the filtrate was concentrated under reduced pressure. The residual oil, 2-[benzyl(2-dimethylaminoethyl)amino]-pyridine N-oxide free base, crystallized after being evacuated for several days at less than fifty microns of mercury pressure. This produce was a very hygroscopic white solid having a melting point (sealed tube) of 100–103 degrees centigrade.

2-[benzyl(2-dimethylaminoethyl)amino]-pyridine free base was converted to the dipicrate, prepared by mixing ethanol solutions of the free base and picric acid, respectively. The dipicrate had a melting point of 163.5–166 degrees centigrade.

*Analysis.*—Calcd. for $C_{28}H_{27}N_9O_{15}$: C, 46.09; H, 3.37; N, 17.28. Found: C, 46.42; H, 3.76; N, 16.68.

*Example 2.—2-[benzyl(2-dimethylaminoethyl)amino]-pyridine N-oxide dihydrobromide*

An ethanol solution of 2-[benzyl(2-dimethylaminoethyl)amino]-pyridine N-oxide was saturated with dry hydrogen bromide. The solid thus produced, 2-[benzyl-(2-dimethylaminoethyl)amino]-pyridine N-oxide dihydrobromide, was recovered and recrystallized from absolute ethanol; melting point 185–186 degrees centigrade with decomposition.

*Analysis.*—Calcd. for $C_{16}H_{23}Br_2N_3O$: C, 44.35; H, 5.35; N, 9.70; Br, 36.90. Found: C, 44.68; H, 5.46; N, 9.88; Br, 36.18.

In place of hydrobromic acid there may be substituted appropriate acids to obtain the hydrochloride, the hydroiodide, the sulfate, the phosphate, the nitrate, the acetate, the benzoate, the salicylate, the glycolate, the succinate, the nicotinate, the tartrate, the maleate, the malate, the lactate, and the like.

The novel compounds of this invention can be used for the same purposes and in the same dosage forms, such as tablets, injectables, and elixirs, as 2-[benzyl(2-dimethylaminoethyl)amino]-pyridine and the salts thereof.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A compound selected from the class consisting of 2-[benzyl(2-dimethylaminoethyl)amino]-pyridine N-oxide free base and 2-[benzyl(2-dimethylaminoethyl)-amino]-pyridine N-oxide acid addition salt of a pharmacologically acceptable acid.

2. 2-[benzyl(2 - dimethylaminoethyl)amino] - pyridine N-oxide free base.

3. 2-[benzyl(2 - dimethylaminoethyl)amino] - pyridine N-oxide acid addition salt of a pharmacologically acceptable acid.

4. 2-[benzyl(2 - dimethylaminoethyl)amino] - pyridine N-oxide dihydrobromide.

5. 2-[benzyl(2 - dimethylaminoethyl)amino] - pyridine N-oxide dipicrate.

No references cited.